(12) United States Patent
Kuan

(10) Patent No.: US 7,208,715 B2
(45) Date of Patent: Apr. 24, 2007

(54) SCANNING METHOD OF IMAGE SCANNER AND IMAGE SCANNER HAVING A PLURALITY OF COLOR LIGHT SOURCES WITH A CONTROL CIRCUIT

(75) Inventor: Chien Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 219 days.

(21) Appl. No.: 11/075,714

(22) Filed: Mar. 10, 2005

(65) Prior Publication Data

US 2006/0157641 A1    Jul. 20, 2006

(30) Foreign Application Priority Data

Jan. 14, 2005    (TW)    .............................. 94101090 A

(51) Int. Cl.
*H01L 27/00* (2006.01)

(52) U.S. Cl. .................................... 250/208.1; 250/205
(58) Field of Classification Search ............. 250/208.1, 250/205, 226, 234, 235; 358/515, 475
See application file for complete search history.

(56) References Cited

U.S. PATENT DOCUMENTS 4,652,913 A * 3/1987 Saitoh et al. ............... 358/509

* cited by examiner

*Primary Examiner*—Que T. Le
(74) *Attorney, Agent, or Firm*—Bacon & Thomas, PLLC

(57) ABSTRACT

An image scanner and scanning method thereof are provided. By simultaneously using two light emitting diodes of different colors as light sources and cooperatively performing simple image data computations, three color image signals are obtained so as to shorten the exposure time and improve signal-to-noise ratio of the image signal.

6 Claims, 3 Drawing Sheets

SCANNING METHOD OF IMAGE SCANNER AND IMAGE SCANNER HAVING A PLURALITY OF COLOR LIGHT SOURCES WITH A CONTROL CIRCUIT

FIELD OF THE INVENTION

The present invention relates to an image scanning method, and more particularly to an image scanning method of an image scanner having contact image sensors.

BACKGROUND OF THE INVENTION

Image scanners are commonly used in offices or homes for scanning for example documents, photographs or film. For example, the scanned images are stored into a computer. Alternatively, the scanned images can be directly printed from or stored into multifunction peripherals.

When an image scanner is operated, an image sensing module such as a charge couple device (CCD) or contact image sensor (CIS), is employed to produce electronic signals of images. Nowadays, since the contact image sensor has less volume than the charge couple device, many manufactures make efforts in developing the technologies of the contact image sensor applied to the scanner.

CIS modules are generally classified as two major types as shown in FIGS. 1 and 2.

Referring to FIG. 1, a schematic view of the first type CIS module is shown. In FIG. 1, the first type CIS module 100 comprises a cold cathode fluorescent lamp 101 and three rows of image sensors. The red image sensors comprise a plurality of sensors R1–RN. The green image sensors comprise a plurality of sensors G1–GN. The blue image sensors comprise a plurality of sensors B1–BN. The cold cathode fluorescent lamp 101 is used as a light source to project light onto the object to be scanned. The light reflected from the scanned object is received by these three rows of image sensors so as to generate image signals of the scanned object. As known, the red image sensors R1–RN, the green image sensors G1–GN and the blue image sensors B1–BN are capable of generating red, green and blue image signals, respectively.

Referring to FIG. 2, a schematic view of the second type CIS module is shown. In FIG. 2, the second type CIS module 200 comprises one row of image sensors S1–SN and three light emitting diodes (LEDs) for emitting three different colors. For these light emitting diodes, the terms "LED R", "LED G" and "LED B" indicate red LED, green LED and blue LED, respectively. During scanning operation, only one of these LEDs is turned on at the same time and thus red, green and blue image signals of the scanned object are successively generated. Generally, the red LED is turned on to use as a light source to project red light onto the object to be scanned and thus the image sensors Si–SN generate red image signals of the scanned object. Successively, the green LED is turned on to generate green image signals of the scanned object. Afterward, the blue LED is turned on to generate blue image signals of the scanned object.

In views of a comparison between these two types of conventional CIS modules, the second type CIS module shown in FIG. 2 is more cost-effective than the first type CIS module in FIG. 1 because the second type CIS module needs only one row of image sensors. In contrast, for the first type CIS module in FIG. 1, three rows of image sensors are required.

Although the second type CIS module shown in FIG. 2 is advantageous due to its cost effectiveness, such a CIS module still has some drawbacks in use. For example, the second type CIS module shown in FIG. 2 utilizes three LEDs as light sources to emit light with three different colors. Since each scan line only receives the light emitted from a single LED at the same time, the brightness of the light source is often insufficient for the image sensors. This insufficient brightness leads to an unsatisfactory signal-to-noise ratio of the image signal. In order to overcome this problem, conventionally, high-brightness LEDs are used to emit intense light. This solution, however, results in an increased cost of the CIS module. Another solution is to extend the exposure time of the image sensors. In other words, for each scan line, the time period for the LED to project light thereon is increased such that the light amount received by the image sensors is increased. In such way, however, the scanning operation is time-consuming and the scanning speed is reduced.

SUMMARY OF THE INVENTION

It is an object of the present invention to provide a scanning method by simultaneously using two light emitting diodes of different colors as light sources and cooperatively performing simple image data computations so as to shorten the exposure time and improve signal-to-noise ratio of the image signal.

In accordance with a first aspect of the present invention, there is provided a scanning method of an image scanner. The image scanner comprises an image sensing module for generating an electronic signal of an image of a scanned object. The image sensing module comprises a row of sensors and first, second and third light sources for emitting light of first, second and third colors, respectively. The scanning method comprises the following steps. Firstly, the first and second light sources are simultaneously turned on to have the sensors generate a first output image including first and second color images of the scanned object. Then, the second and third light sources are simultaneously turned on the to have the sensors generate a second output image including second and third color images of the scanned object. Then, the first and third light sources are simultaneously turned on to have the sensors generate a third output image including first and third color images of the scanned object. Afterward, the first, second and third color images of the scanned object are generated. The first color image is obtained from $$\frac{\text{first output image} + \text{second output image} + \text{third output image}}{2} - \text{second output image}$$

The second color image is obtained from $$\frac{\text{first output image} + \text{second output image} + \text{third output image}}{2} - \text{third output image.}$$

The third color image is obtained from $$\frac{\text{first output image} + \text{second output image} + \text{third output image}}{2} - \text{first output image}.$$

Preferably, the first, second and third colords are red, green and blue colors, respectively.

Preferably, the image sensing module is a contact image sensor (CIS) module.

In accordance with a second aspect of the present invention there is provided an image scanner. The image scanner comprises an image sensing module and a control circuit. The image sensing module is used for generating an electronic signal of an image of a scanned object, and comprises a row of sensors and red, green and blue light sources for emitting red light, green light and blue light, respectively. The control circuit is for controlling on/off states of the red, green and blue light sources. The control circuit simultaneously turns on the red and green light sources to have the sensors generate a first output signal including red and green image signals of the scanned object, simultaneously turns on the green and blue light sources to have the sensors generate a second output signal including green and blue image signals of the scanned object, and simultaneously turns on the blue and red light sources to have the sensors generate a third output signal including blue and red image signals of the scanned object.

In accordance with a third aspect of the present invention, there is provided an image scanning method for generating an image signal of a scanned objected. The scanning method comprises the following steps. Firstly, a first color light and a second color light are used simultaneously to generate a first output image including first and second color images of the scanned object. Then, a second color light and a third color light are simultaneously used to generate a second output image including second and third color images of the scanned object. Then, a first color light and a third color light are simultaneously used to generate a third output image including first and third color images of the scanned object. Afterward, the first, second and third color images of the scanned object are generated.

The first color image is obtained from $$\frac{\text{first output image} + \text{second output image} + \text{third output image}}{2} - \text{second output image}$$

The second color image is obtained from $$\frac{\text{first output image} + \text{second output image} + \text{third output image}}{2} - \text{third output image}.$$

The third color image is obtained from $$\frac{\text{first output image} + \text{second output image} + \text{third output image}}{2} - \text{first output image}.$$

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
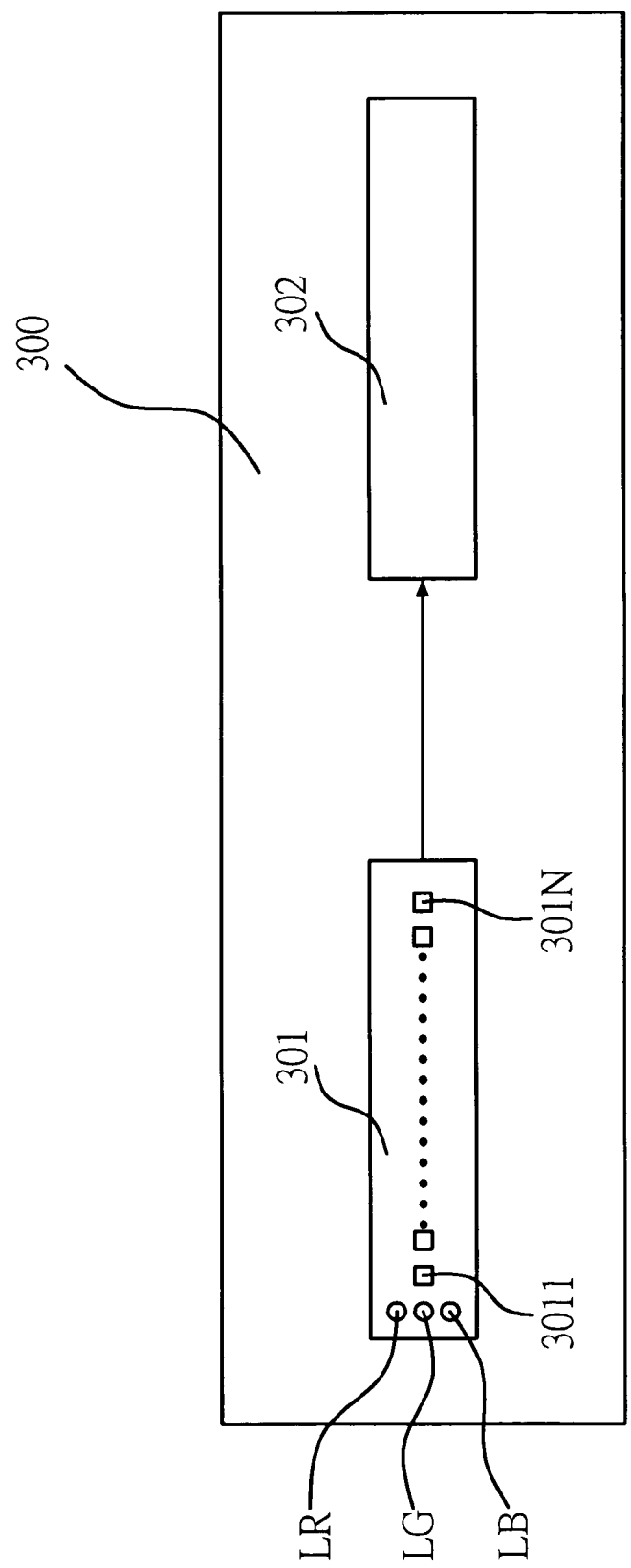
FIG. 3 is a functional block diagram illustrating an image scanner according to a preferred embodiment of the present invention.

Referring to FIG. 3, a schematic block diagram of an image scanner according to a preferred embodiment of the present invention is shown. The image scanner 300 in FIG. 3 comprises an image sensing module 301 and a control circuit 302. The image sensing module 301 comprises a row of image sensors 3011–301N and three LEDs as light sources. The terms "LED LR", "LED LG" and "LED LB" indicate red LED, green LED and blue LED, respectively.

The present invention will now be described more specifically with reference to the FIG. 3 and Table 1.

TABLE 1

| Scan line | First output image | Second output image | Third output image |
|---|---|---|---|
| L1 | R1 + G1 | G1 + B1 | B1 + R1 |
| L2 | R2 + G2 | G2 + B2 | B2 + R2 |
| ... | ... | ... | ... |

In Table 1, R1, G1 and B1 indicate the red, green and blue images for the scan line L1, respectively.

In Table 1, R1, G1 and B1 indicate the red, green and blue images for the scan line L1, respectively.

In this embodiment, the red, green and blue colors are referred as first, second and third colors, respectively. During scanning operation on the scan line L1, under control of the control circuit 302, the red LED LR and the green LED LG simultaneously illuminate, and thus the first output image generated from the image sensors 3011–301N includes both the red and green images of the scan line L1. Successively, the green LED LG and the blue LED LB are controlled to simultaneously illuminate, and thus the second output image generated from the image sensors 3011–301N includes both the green and blue images of the scan line L1. Afterward, the red LED LR and the blue LED LB are controlled to simultaneously illuminate, and thus the third output image generated from the image sensors 3011–301N includes both the red and blue images of the scan line L1. Meanwhile, the scanning operation on the scan line L1 is implemented. Then, under control of the control circuit 302, the red, green and blue images of the scan line L1 are obtained from the first output image, the second output image and the third output image according to the following computing equations.

$$\frac{(R1+G1)+(G1+B1)+(B1+R1)}{2}-(R1+G1)=B1$$

$$\frac{(R1+G1)+(G1+B1)+(B1+R1)}{2}-(G1+B1)=R1$$

$$\frac{(R1+G1)+(G1+B1)+(B1+R1)}{2}-(R1+B1)=G1$$

The above equations can be rewritten as follows:

$$\frac{1st \text{ output image} + \frac{2nd \text{ output image} + 3rd \text{ output image}}{2}}{} - 1st \text{ output image} = \text{blue image}$$

$$\frac{1st \text{ output image} + \frac{2nd \text{ output image} + 3rd \text{ output image}}{2}}{} - 2nd \text{ output image} = \text{red image}$$

$$\frac{1st \text{ output image} + \frac{2nd \text{ output image} + 3rd \text{ output image}}{2}}{} - 3rd \text{ output image} = \text{green image}$$

From the above equations, it is found that the red, green and blue images of the scan lines can be obtained from the first output image, the second output image and the third output image according to simple arithmetic computations.

It is appreciated that the computing operations on the red, green and blue image data of the scan lines can be performed in a computer electrically connected to the image scanner.

Figure 1:
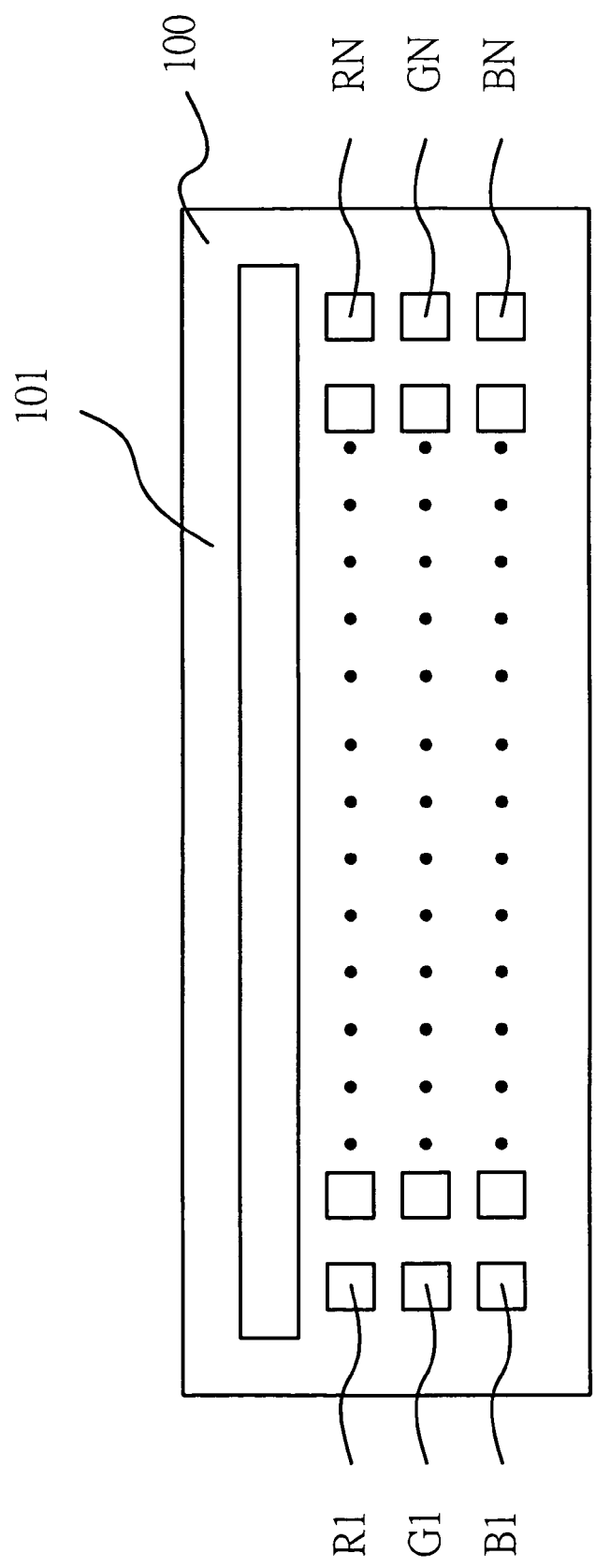
FIG. 1 is a schematic view illustrating the first CIS module according to prior art.
Figure 2:
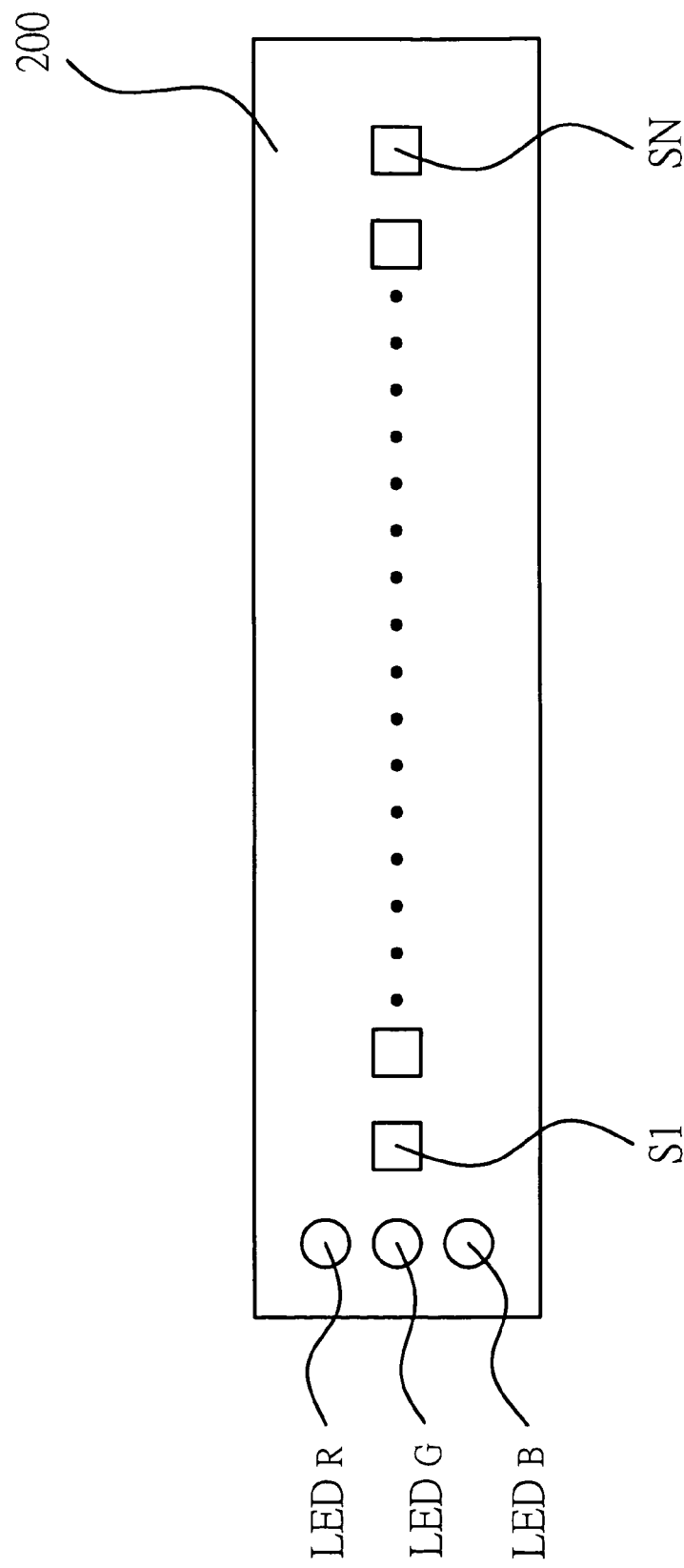
FIG. 2 is a schematic view illustrating the second CIS module according to prior art.

Since the scanning method of the present invention is operated by simultaneously turning on two LEDs as the light sources of the image sensors, the brightness of light doubles when compared with the conventional CIS modules described in FIGS. 1 and 2. As such, the exposure time for each scan line is shortened and thus the scanning speed is increased. By the way, since the brightness of the light source is increased, the signal-to-noise ratio of the image signal is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning method of an image scanner, said image scanner comprising an image sensing module for generating an electronic signal of an image of a scanned object, said image sensing module comprising a row of sensors and first, second and third light sources for emitting light of first, second and third colors respectively, said scanning method comprising steps of:

simultaneously turning on said first and second light sources to have said sensors generate a first output image including first and second color images of said scanned object;

simultaneously turning on said second and third light sources to have said sensors generate a second output image including second and third color images of said scanned object;

simultaneously turning on said first and third light sources to have said sensors generate a third output image including first and third color images of said scanned object; and generating said first, second and third color images of said scanned object, wherein said first color image is obtained from $$\frac{\text{first output image} + \frac{\text{second output image} + \text{third output image}}{2}}{} - \text{second output image}$$

said second color image is obtained from $$\frac{\text{first output image} + \frac{\text{second output image} + \text{third output image}}{2}}{} - \text{third output image}$$

said third color image is obtained from $$\frac{\text{first output image} + \text{second output image} + \frac{\text{third output imgae}}{2}}{} - \text{first output image}.$$

2. The scanning method of an image scanner according to claim 1 wherein said first, second and third colors are red, green and blue colors, respectively.

3. The scanning method of an image scanner according to claim 1 wherein said image sensing module is a contact image sensor (CIS) module.

4. An image scanner comprising:

an image sensing module for generating an electronic signal of an image of a scanned object, and comprising a row of sensors and red, green and blue light sources for emitting red light, green light and blue light, respectively;

a control circuit for controlling on/off states of said red, green and blue light sources, said control circuit simultaneously turning on said red and green light sources to have said sensors generate a first output signal including red and green image signals of said scanned object, simultaneously turning on said green and blue light sources to have said sensors generate a second output signal including green and blue image signals of said scanned object, and simultaneously turning on said blue and red light sources to have said sensors generate a third output signal including blue and red image signals of said scanned object.

5. An image scanning method for generating an image signal of a scanned objected, said method comprising steps of:

simultaneously using a first color light and a second color light to generate a first output image including first and second color images of said scanned object;

simultaneously using a second color light and a third color light to generate a second output image including second and third color images of said scanned object;

simultaneously using a first color light and a third color light to generate a third output image including first and third color images of said scanned object; and generating said first, second and third color images of said scanned object, wherein said first color image is obtained from $$\frac{\text{first output image} + \text{second output image} + \text{third output imgae}}{2} - \text{second output image}$$

said second color image is obtained from $$\frac{\text{first output image} + \text{second output image} + \text{third output imgae}}{2} - \text{third output image}$$

said third color image is obtained from $$\frac{\text{first output image} + \text{second output image} + \text{third output imgae}}{2} - \text{first output image}.$$

6. The scanning method according to claim 5 wherein said first, second and third colors are red, green and blue colors, respectively.

* * * * *